United States Patent [19]
Feiller et al.

[11] Patent Number: 5,838,602
[45] Date of Patent: Nov. 17, 1998

[54] FAST CARRY GENERATION ADDER HAVING GROUPED CARRY MUXES

[75] Inventors: Ronald L. Feiller, Whitehall; Hon Shing Lau; Le Tieu Ly, both of Allentown, all of Pa.

[73] Assignee: Lucent Technologies Inc., Murray Hill, N.J.

[21] Appl. No.: 712,532

[22] Filed: Sep. 11, 1996

[51] Int. Cl.[6] .................................................. G06F 7/50
[52] U.S. Cl. ............................................................ 364/788
[58] Field of Search ............................................. 364/788

[56] References Cited

U.S. PATENT DOCUMENTS

| | | | |
|---|---|---|---|
| 3,553,446 | 1/1971 | Kruy | 364/788 |
| 4,682,303 | 7/1987 | Uya | 364/788 |
| 5,027,311 | 6/1991 | Zion | 364/788 |
| 5,229,959 | 7/1993 | Scriber | 364/788 |
| 5,272,662 | 12/1993 | Scriber et al. | 364/788 |
| 5,471,414 | 11/1995 | Kumar et al. | 364/788 |

*Primary Examiner*—David H. Malzahn

[57] ABSTRACT

An integrated circuit having a fast carry generation adder for adding together two input signals has an initial stage and two or more intermediate stages. The adder may also include a final stage. Each intermediate stage has a carry mux and these carry muxes are grouped together, for example, adjacent to the initial stage and adjacent to the first intermediate stage. By grouping the carry muxes together, for example, in a column below the initial stage, the fast carry generation adder may be both faster and smaller than conventional adders and may reduce or even eliminate the need for any buffering between successive carry muxes.

20 Claims, 4 Drawing Sheets

FAST CARRY GENERATION ADDER HAVING GROUPED CARRY MUXES

BACKGROUND OF THE INVENTION

1. Field of the Invention

The present invention relates to solid-state circuit devices, and, in particular, to devices for adding two binary input signals.

2. Description of the Related Art

Referring now to FIG. 1, there is shown a schematic layout of a conventional carry select adder. Carry select adders are a particular type of solid-state device that efficiently adds two binary signals together. Carry select adder 100 of FIG. 1 is a 42-bit device with 7 stages: initial stage 102, five intermediate stages 104–112, and final stage 114. Initial stage 102 comprises adder group 116. Each of intermediate stages 104–112 comprises two adder groups, a carry multiplexer (mux), and a sum mux. For example, intermediate stage 104 comprises adder groups 118 and 130, carry mux 142, and sum mux 152. Final stage 114 comprises two adder groups 128 and 140 and sum mux 162.

Adder groups 116–140 perform addition operations on different subsets of bits. As shown in FIG. 1, adder groups 116, 118, and 130 operate on 4-bit inputs; adder groups 120, 122, 128, 132, 134, and 140 operate on 6-bit inputs; and adder groups 124, 126, 136, and 138 operate on 8-bit inputs. Each adder group receives a carry input signal representing the carry bit from the previous adder group. In addition, each adder group generates a carry output signal representing the carry bit to the next adder group.

Each adder group handles any carry bits that occur within its subset of bits internally. For example, adder group 116 adds together the first 4 bits of input signal a and the first 4 bits of input signal b. Any carry bits from adding the first 3 of these 4 bits of a and b are handled within the circuitry of adder group 116.

The carry input to each of adder groups 118–128 is hardwired to 1 (high). As such, these adder groups are referred to in this specification as "carry-in-one adder groups." Analogously, the carry input to each of adder groups 130–140 is hardwired to 0 (low). These adder groups are referred to as "carry-in-zero adder groups" in this specification. The carry input cin to adder group 116 can be high (1) or low (0).

The carry outputs from adder groups 118–126 and 130–138 are connected to the data inputs of their corresponding carry muxes 142–150. Similarly, the data outputs from adder groups 118–128 and 130–140 are connected to the data inputs of their corresponding sum muxes 152–162.

The carry output from adder group 116 is connected to the selection inputs of both carry mux 142 and sum mux 152. Similarly, the data outputs from carry muxes 142–148 are connected to the selection inputs of the next carry muxes 144–150 as well as to the selection inputs of sum muxes 154–160, respectively. In addition, the data output from carry mux 150 is connected to the selection input of sum mux 162.

When two 42-bit input signals a[41:0] and b[41:0] and a carry input cin are applied to the data inputs of adder groups 116–140 as shown in FIG. 1, carry select adder 100 generates a 42-bit output signal s[41:0] which corresponds to the sum of a[41:0] and b[41:0]. Carry select adder 100 efficiently generates the sum s[41:0] by performing much of its processing in parallel. For example, adder groups 116–140 start generating their partial sums in parallel, based on the received subsets of bits of input signals a[41:0] and b[41:0] and whether their carry inputs are set high (1) or low (0). Typically, those adder groups that process fewer bits will complete the generation of their partial sums before those adder groups that process more bits.

Except for the initial stage, each stage of adder 100 generates two different types of partial sums: a carry-in-one partial sum and a carry-in-zero partial sum. The carry-in-one partial sum is generated by the stage's carry-in-one adder group. The carry-in-one partial sum is based on the assumption that the carry output generated by the previous stage will be 1. Similarly, the carry-in-zero partial sum is generated by the stage's carry-in-zero adder group. The carry-in-zero partial sum is based on the assumption that the carry output generated by the previous stage will be 0. The carry outputs from adder groups 116–126 and 130–138 and the data outputs from carry muxes 142–150 are then used to determine which of these two partial sums for each stage is to be selected as part of the output signal s[41:0].

For example, the carry output from adder group 116 is the selection input to sum mux 152. As such, that carry output determines whether sum mux 152 selects the data output from adder group 118 or the data output from adder group 130 for the 4-bit partial sum s[7:4]. If the carry output from adder group 116 is high (1), then sum mux 152 outputs the partial sum received from carry-in-one adder group 118. Otherwise, the carry output from adder group 116 is low (0) and sum mux 152 outputs the partial sum received from carry-in-zero adder group 130.

In addition, the carry output from adder group 116 is also the selection input to carry mux 142. As such, that carry output determines whether carry mux 142 selects the carry output from adder group 118 or the carry output from adder group 130 to be the data output from carry mux 142. If the carry output from adder group 116 is high, then carry mux 142 outputs the carry output received from adder group 118. Otherwise, the carry output from adder group 116 is low and carry mux 142 outputs the carry output received from adder group 130. Analogous processing is implemented by sum muxes 154–162 and carry muxes 144–150.

By having adder groups 116–140 perform their individual processing in parallel, the processing speed involved in generating the sum s[41:0] is faster than if each bit addition had to wait for the completion of the previous bit addition to resolve whether the carry out from the previous bit addition is a 1 or a 0.

As with most solid-state circuit devices, it is desirable to improve the processing speed of carry select adders like that shown in FIG. 1. If such an improved carry select adder is also smaller than conventional devices, it is that much more desirable.

The present invention is directed to improved carry select adders that may be both faster and smaller than conventional carry select adders such as that shown in FIG. 1.

Further objects and advantages of this invention will become apparent from the detailed description which follows.

SUMMARY OF THE INVENTION

The present invention is directed to an integrated circuit having a fast carry generation adder. According to one embodiment, the fast carry generation adder comprises an initial stage and two or more intermediate stages, connected to the initial stage. Each intermediate stage comprises a carry mux and the carry muxes are interconnected and grouped together.

According to another embodiment of the present invention, the fast carry generation adder comprises an initial stage, two or more intermediate stages, and a final stage. The initial stage comprises an initial adder group. Each intermediate stage comprises a carry-in-one adder group, a carry-in-zero adder group, a carry mux, and a sum mux. The final stage comprises a carry-in-one adder group, a carry-in-zero adder group, and a sum mux. For each intermediate stage, carry outputs from the carry-in-one adder group and the carry-in-zero adder group are data inputs to the carry mux, and data outputs from the carry-in-one adder group and the carry-in-zero adder group are data inputs to the sum mux. For the final stage, data outputs from the carry-in-one adder group and the carry-in-zero adder group are data inputs to the sum mux. A carry output from the initial adder group is a selection input to the carry mux of a first intermediate stage and a selection input to the sum mux of the first intermediate stage. A data output from the carry mux of each intermediate stage except for a last intermediate stage is a selection input to the carry mux of a next intermediate stage and a selection input to the sum mux of the next intermediate stage. A data output from the carry mux of the last intermediate stage is a selection input to the sum mux of the final stage. The carry muxes are grouped together.

According to yet another embodiment of the present invention, the fast carry generation adder comprises an initial stage and two or more intermediate stages, connected to the initial stage. Each intermediate stage comprises a carry mux, and an output from one of the carry muxes drives an input to another of the carry muxes without any buffering.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

Figure 1:
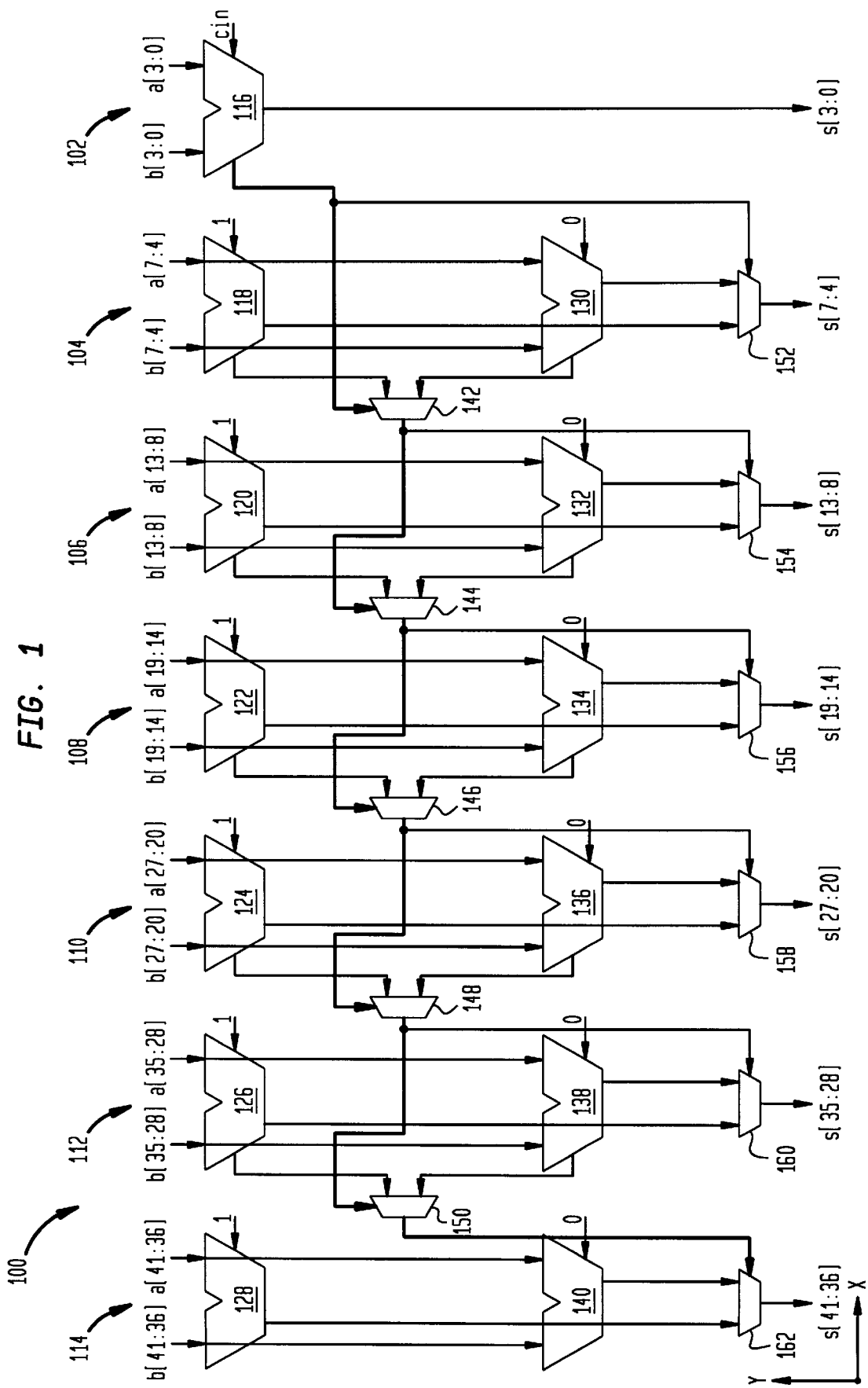
FIG. 1 is a schematic layout of a conventional 42-bit carry select adder.

The present invention is directed to an integrated circuit having a fast carry generation adder, such as a carry select adder, that provides certain advantages over conventional adders, such as the conventional carry select adder shown in FIG. 1. These advantages result from novel features in the physical layout of the components contained in the adders of the present invention. These features enable carry select adders that may be both faster and smaller than the carry select adder of FIG. 1. Improvements to both the speed and size of such devices may be achieved by grouping the carry muxes more closely together, for example, by locating them in a stack adjacent to the group adder of the initial stage.

Figure 2:
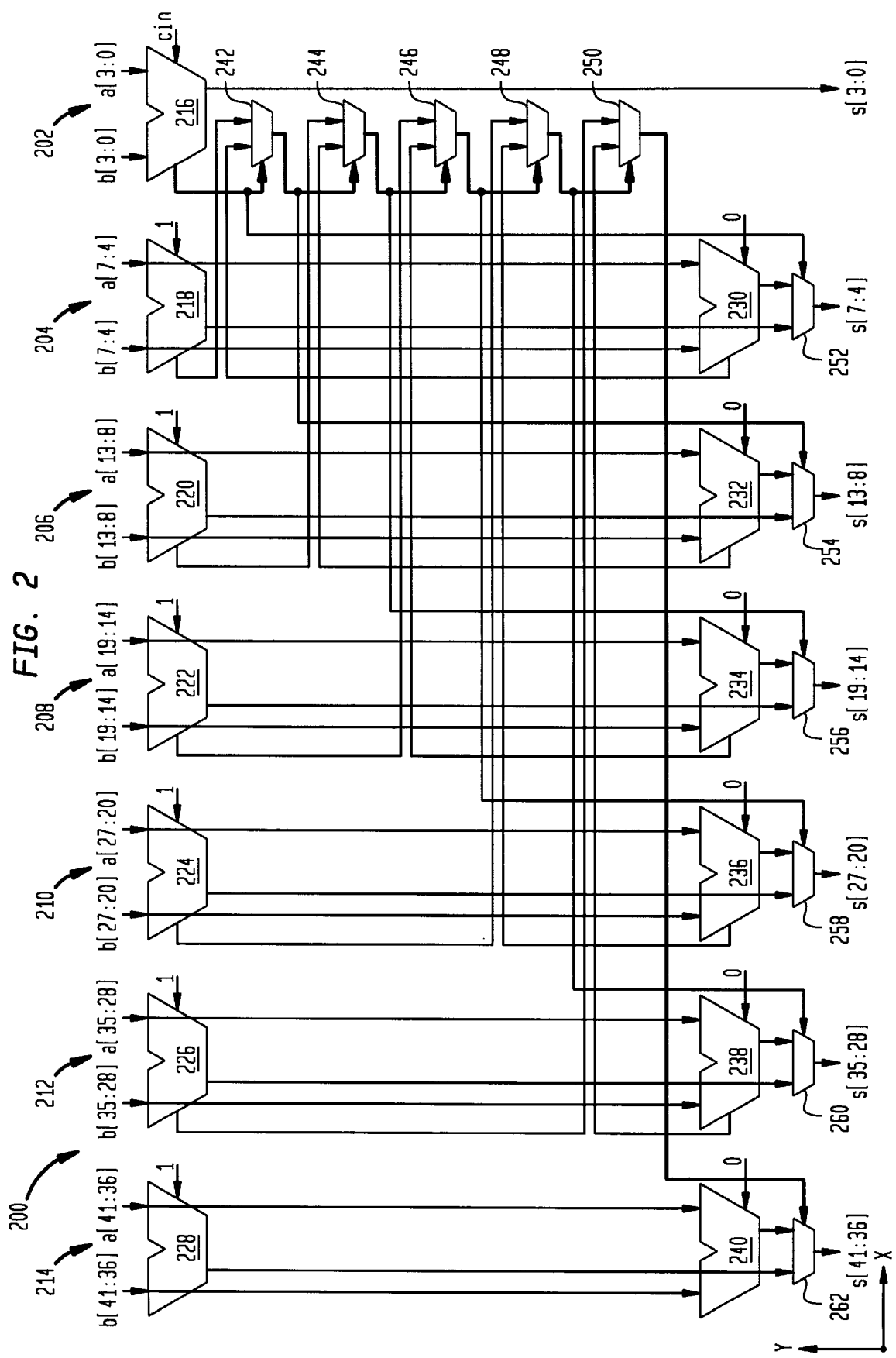
FIG. 2 is a schematic layout of a carry select adder, according to one embodiment of the present invention.

Referring now to FIG. 2, there is shown a schematic layout of carry select adder 200, according to one embodiment of the present invention. Carry select adder 200 is an embodiment of the present invention that corresponds to conventional carry select adder 100 of FIG. 1. Like conventional carry select adder 100 of FIG. 1, carry select adder 200 has 7 stages: initial stage 202, five intermediate stages 204–212, and final stage 214. Initial stage 202 comprises adder group 216. Each of intermediate stages 204–212 comprises two adder groups, a carry mux, and a sum mux. For example, intermediate stage 204 comprises adder groups 218 and 230, carry mux 242, and sum mux 252. Final stage 214 comprises two adder groups 228 and 240 and sum mux 262. Although carry muxes 242–250 are not physically co-located with the other components of their respective stages (as was the case with the carry muxes of conventional adder 100 of FIG. 1), carry muxes 242–250 are still considered to be parts of those stages, as that terminology is used in this specification.

Functionally, carry select adder 200 of the present invention is directly analogous to conventional carry select adder 100. Each of the adder groups of adder 200 is functionally equivalent to an adder group of adder 100. Similarly, each of the sum muxes and carry muxes of adder 200 performs the same functions as a sum mux or a carry mux of adder 100. Furthermore, the inputs and outputs of these adder groups, sum muxes, and carry muxes of adder 200 are all interconnected in analogous fashion to the interconnections between the corresponding components of adder 100. As a result, adder 200 generates the same sum s[41:0] as adder 100, when the same inputs a[41:0], b[41:0], and cin are applied to the appropriate corresponding inputs.

Differences between carry select adder 200 of the present invention and conventional carry select adder 100 lie in how the components are laid out to form the device—that is, how the various components are physically located with respect to one another.

As shown in FIG. 1, in conventional adder 100, each carry mux of each stage is co-located with the other components of that stage. For example, carry mux 142 of stage 104 is physically located (in the Y direction) between adder groups 118 and 130 of stage 104 and (in the X direction) immediately adjacent to adder groups 118 and 130. Similarly, carry muxes 144–150 of stages 106–112, respectively, are located (in the Y direction) between and (in the X direction) immediately adjacent to the two adder groups of their respective stages.

As shown in FIG. 2, however, in adder 200 of the present invention, carry muxes 242–250 are not co-located with the other components of their respective stages. Rather, carry muxes 242–250 are all grouped together in a stack (for example, in the Y direction) adjacent to adder group 216 of initial stage 202. As shown in FIG. 2, carry muxes 242–250 are located in a column below the initial stage, where the initial stage corresponds to the least significant bits and the term "below" means in the negative Y direction of FIG. 2. Those skilled in the art will understand that this is one possible configuration of carry select adders of the present invention.

Figure 5:
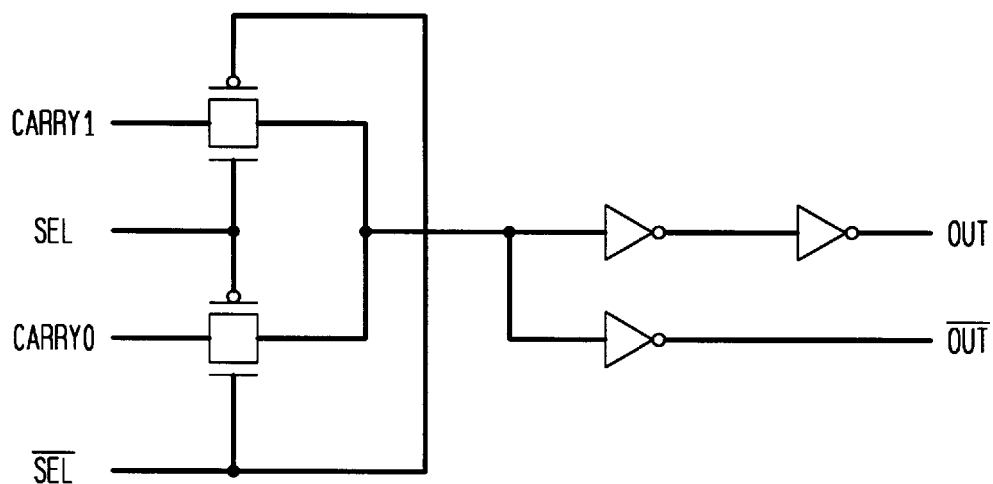
FIG. 5 shows a schematic diagram of a typical carry mux with buffering of the carry output for a conventional carry select adder such as that shown in FIG. 1.

According to the physical layout of conventional adder 100 as shown in FIG. 1, assuming, for example, 0.5-$\mu$m technology, carry muxes 142–150 are physically separated from one another (for example, by about 250 microns). As described above, the data output from each carry mux is connected to the selection input of the next carry mux. For example, the data output of carry mux 142 is connected to the selection input of carry mux 144. In a conventional adder 100, in order for the output from one carry mux to drive the selection input of the next carry mux over the distance between each the two successive carry muxes, the data output from the first carry output is buffered. FIG. 5 shows a schematic diagram of a typical carry mux with buffering of the carry output. When used in conventional adder 100 of FIG. 1, FIG. 5 shows carry muxes 142–150 with buffering of the carry output.

Those skilled in the art will understand that the need for such buffering is due to the relatively large capacitance between the successive carry muxes. The larger the distance between the carry muxes, the greater the capacitance. The greater the capacitance, the greater the need to buffer the data output of one carry mux to drive the selection input of the next carry mux to achieve a sufficiently fast response.

Figure 6:
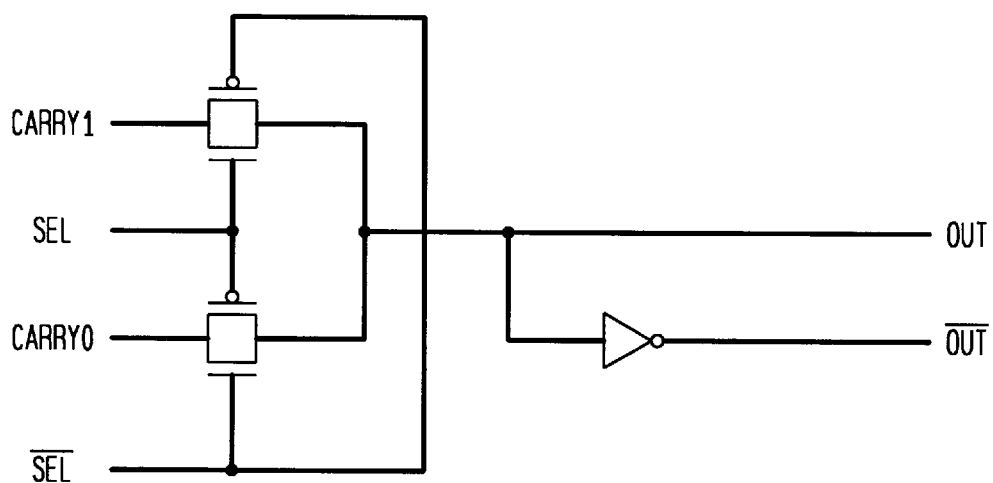
FIG. 6 shows a schematic diagram of each of the carry muxes of the carry select adder of FIG. 2.

According to the present invention, as shown in FIG. 2, the carry muxes of adder 200 are grouped together such that there is a reduced need for buffering the data output from one carry mux in order to drive the selection input of the next carry mux. In fact, in some embodiments of the present invention, the distance between carry muxes is small enough (e.g., about 10 microns) such that there is no need for any buffering between successive carry muxes. In these embodiments, the data output of one carry mux drives the selection input to the next carry mux without any buffering. FIG. 6 shows a schematic diagram of each of carry muxes 242–250, according to one embodiment of the present invention. As shown in FIG. 6, these carry muxes do not buffer the carry output. Those skilled in the art will understand that other designs for carry muxes may also be used with the present invention.

Those skilled in the art will understand that buffering may be required between the data outputs of the carry muxes and the selection inputs of the sum muxes of both conventional adder 100 and adder 200 of the present invention. These buffers are not shown in FIGS. 1 and 2, but are understood to be present if needed to achieve acceptable processing speed.

Another advantage of the present invention relates to the size of the carry select adders. Carry select adders of the present invention may be smaller in size than corresponding conventional carry select adders.

Figure 3:
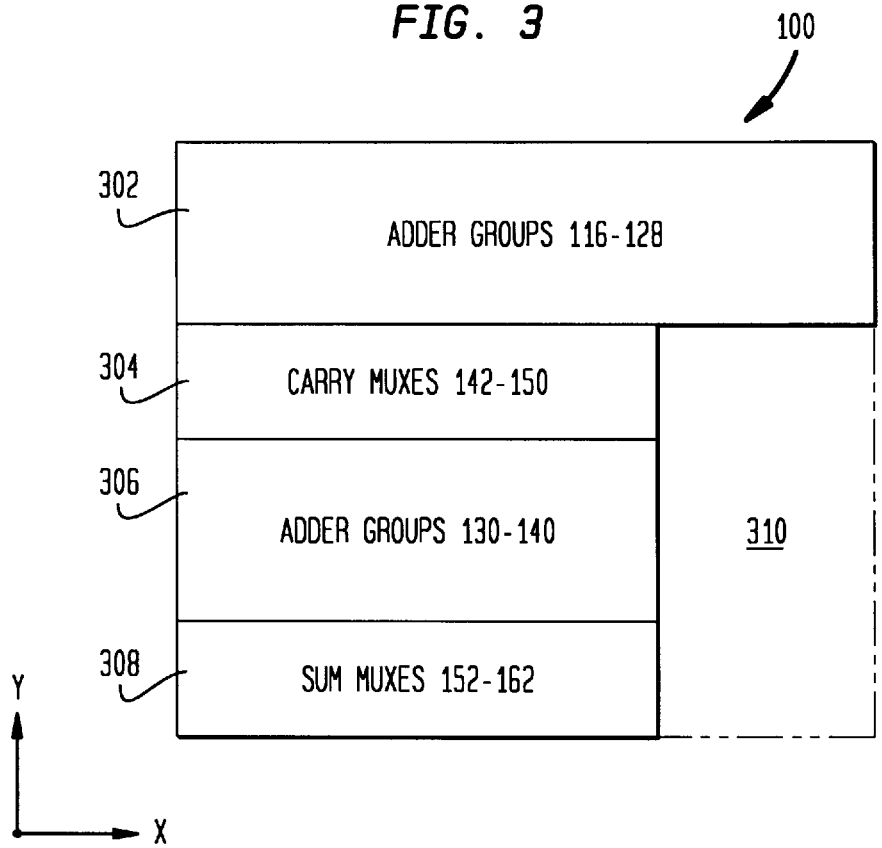
FIG. 3 is a schematic diagram representing the physical dimensions of the conventional carry select adder of FIG. 1.

Referring now to FIG. 3, there is shown a schematic diagram representing the physical dimensions of conventional carry select adder 100 of FIG. 1. Area 302 of adder 100 comprises adder groups 116–128 of FIG. 1, area 304 comprises carry muxes 142–150, area 306 comprises adder groups 130–140, and area 308 comprises sum muxes 152–162.

In addition, a substantially empty region 310 exists (in the Y direction) adjacent to the bottom right edge of area 302 and (in the X direction) adjacent the right sides of areas 304–308. This empty region 310, which is essentially wasted space, results from the fact that stage 102 of adder 100 comprises a single adder group (116) and no muxes, as shown in FIG. 1.

Figure 4:
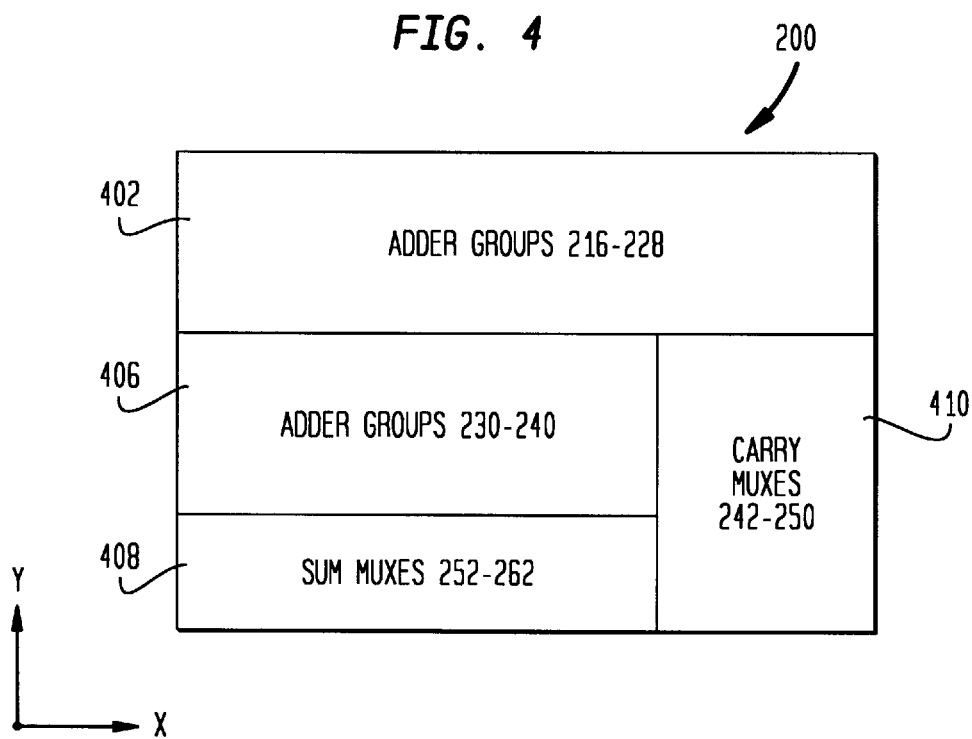
FIG. 4 is a schematic diagram representing the physical dimensions of the carry select adder of FIG. 2.

Referring now to FIG. 4, there is shown a schematic diagram representing the physical dimensions of carry select adder 200 of FIG. 2, according to one embodiment of the present invention. Area 402 of adder 200 comprises adder groups 216–228 of FIG. 2, area 406 comprises adder groups 230–240, and area 408 comprises sum muxes 252–262. According to one embodiment of the present invention, carry muxes 242–250 are located in area 410. Locating carry muxes 242–250 in area 410 makes efficient use of the otherwise essentially unused region adjacent to the bottom right edge of area 402 and adjacent the right sides of areas 406–408, with no corresponding increase in the X dimension of the device. As a result, adder 200 of the present invention is smaller in size than its corresponding conventional adder 100.

Another advantage of carry select adders of the present invention relates to processing speed. The thick lines drawn in FIGS. 1 and 2 represent the time-critical paths of conventional adder 100 and adder 100 of the present invention, respectively. Due to the differences in the physical layouts of the various components of the carry select adders, and the fact that the carry muxes do not need any buffering, the processing speeds of carry select adders of the present invention are faster than those of their corresponding conventional adders.

Alternative Embodiments

Those skilled in the art will understand that carry select adder 200 of FIG. 2 is just one example of the present invention. For example, alternative 42-bit adders of the present invention may have a different sequence of adder groups operating on a different sequence of subsets of bits of the input signals. Similarly, adders other than 42-bit adders may be designed using different numbers of stages and/or different numbers of bits per stage.

Moreover, it will be understood that the design of adder 200 of FIG. 2 may be modified to permit multiple adders to be strung together to form larger adders. For example, a carry mux could be added to final stage 214 analogous to carry muxes 244–250 of intermediate stages 204–212. In this case, the final stage would have the same components as the intermediate stages (i.e., two adder groups, a sum mux, and a carry mux). The carry output cout of the final carry mux could then be connected to the cin carry input of the initial stage of another 42-bit carry select adder to create an 84-bit carry select adder.

In carry select adder 200 of FIG. 2, carry muxes 242–250 are all grouped together in area 410 of FIG. 4. It will be understood that, in alternative embodiments, the carry muxes do not necessarily need to be all grouped together nor do they need to be grouped together in area 410. Other layouts that achieve some or all of the advantages of the present invention are also possible and are within the scope of carry select adders of the present invention.

Although the invention has been described in the context of carry select adders, those skilled in the art will understand that the invention can be implemented in the context of other fast carry generation adders, such as carry look-ahead adders and carry skip adders, in addition to carry select adders.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An integrated circuit having a fast carry generation adder, comprising:

(a) an initial stage comprising an initial adder group; and (b) two or more intermediate stages, connected to the initial stage, wherein:

each intermediate stage comprises a carry-in-one adder group, a carry-in-zero adder group, a sum mux, and a carry mux;

each adder group performs addition operations on different subsets of bits from two binary numbers being added together by the fast carry generation adder;

the initial adder group is connected to both the carry mux and the sum mux of a first of the intermediate stages;

for each intermediate stage, the carry mux and the sum mux are both connected to both the carry-in-one adder group and the carry-in-zero adder group;

the adder groups for the intermediate stages are arranged in an array of row and columns, wherein:
one row corresponds to the carry-in-one adder groups for the intermediate stages;
another row corresponds to the carry-in-zero adder groups for the intermediate stages; and
each column corresponds to the carry-in-one adder group and the carry-in-zero adder group for one of the intermediate stages; and
the carry muxes are interconnected and grouped together in a column substantially parallel to the columns of the array formed by the adder groups for the intermediate stages.

2. The invention of claim 1, further comprising a final stage connected to a last of the intermediate stages, wherein:
the final stage comprises a carry-in-one adder group, a carry-in-zero adder group, and a sum mux; and
the sum mux of the final stage is connected to the carry-in-one adder group and the carry-in-zero adder group of the final stage and to the carry mux of the last of the intermediate stages.

3. The invention of claim 1, wherein there is no buffering between the carry muxes.

4. The invention of claim 1, wherein an output from one of the carry muxes drives an input to another of the carry muxes without any buffering.

5. The invention of claim 4, wherein the output is a data output and the input is a selection input.

6. The invention of claim 1, wherein the carry muxes are located adjacent to the initial stage.

7. The invention of claim 6, wherein the carry muxes are located adjacent to the adder groups for the first of the intermediate stages.

8. The invention of claim 7, wherein an output from one of the carry muxes drives an input to another of the carry muxes without any buffering.

9. The invention of claim 1, wherein the carry muxes are located in a column below the initial adder group of the initial stage.

10. An integrated circuit having a fast carry generation adder, comprising:
(a) an initial stage comprising an initial adder group;
(b) two or more intermediate stages, each intermediate stage comprising a carry-in-one adder group, a carry-in-zero adder group, a carry mux, and a sum mux, wherein, for each intermediate stage:
carry outputs from the carry-in-one adder group and the carry-in-zero adder group are data inputs to the carry mux; and
data outputs from the carry-in-one adder group and the carry-in-zero adder group are data inputs to the sum mux; and
(c) a final stage comprising a carry-in-one adder group, a carry-in-zero adder group, and a sum mux, wherein, for the final stage, data outputs from the carry-in-one adder group and the carry-in-zero adder group are data inputs to the sum mux, wherein:
a carry output from the initial adder group is a selection input to the carry mux of a first intermediate stage and a selection input to the sum mux of the first intermediate stage;
a data output from the carry mux of each intermediate stage except for a last intermediate stage is a selection input to the carry mux of a next intermediate stage and a selection input to the sum mux of the next intermediate stage;
a data output from the carry mux of the last intermediate stage is a selection input to the sum mux of the final stage;
each adder group performs addition operations on different subsets of bits from two binary numbers being added together by the fast carry generation adder;
the adder groups for the intermediate stages are arranged in an array of row and columns, wherein:
one row corresponds to the carry-in-one adder groups for the intermediate stages;
another row corresponds to the carry-in-zero adder groups for the intermediate stages; and
each column corresponds to the carry-in-one adder group and the carry-in-zero adder group for one of the intermediate stages; and
the carry muxes are grouped together in a column substantially parallel to the columns of the array formed by the adder groups for the intermediate stages.

11. The invention of claim 10, wherein there is no buffering between the carry muxes.

12. The invention of claim 10, wherein the data output from one of the carry muxes drives the selection input to another of the carry muxes without any buffering.

13. The invention of claim 10, wherein the carry muxes are located adjacent to the initial stage.

14. The invention of claim 13, wherein the carry muxes are located adjacent to the adder groups for the first intermediate stage.

15. The invention of claim 14, wherein the data output from one of the carry muxes drives the selection input to another of the carry muxes without any buffering.

16. The invention of claim 10, wherein the carry muxes are located in a column below the initial adder group of the initial stage.

17. An integrated circuit having a fast carry generation adder, comprising:
(a) an initial stage comprising an initial adder group;
(b) two or more intermediate stages, connected to the initial stage, each intermediate stage comprising a carry-in-one adder group, a carry-in-zero adder group, a sum mux, and a carry mux; and
(c) a final stage, connected to the two or more intermediate stages, comprising a carry-in-one adder group, a carry-in-zero adder group, and a sum mux, wherein:
each adder group performs addition operations on different subsets of bits from two binary numbers being added together by the fast carry generation adder;
the initial adder group is connected to both the carry mux and the sum mux of a first intermediate stage;
for each intermediate stage, the carry mux and the sum mux are both connected to both the carry-in-one adder group and the carry-in-zero adder group;
for the final stage, the sum mux is connected to both the carry-in-one adder group and the carry-in-zero adder group;
a first plurality of adder groups, comprising the initial adder group and an adder group for each intermediate stage and for the final stage, is arranged to form a first row in the layout of the fast carry generation adder;
a second plurality of adder groups, comprising another adder group for each intermediate stage and for the final stage, is arranged in a second row in the layout of the fast carry generation adder, substantially parallel to the first row; and the carry muxes for the intermediate stages and for the final stage are arranged in a column, substantially perpendicular to the first and second rows, below the initial adder group.

18. The invention of claim 17, wherein the sum muxes for the intermediate stages and for the final stage are arranged in a third row in the layout of the fast carry generation adder, substantially parallel to the first and second rows.

19. The invention of claim 17, wherein there is no buffering between the carry muxes.

20. The invention of claim 17, wherein an output from one of the carry muxes drives an input to another of the carry muxes without any buffering.

* * * * *